United States Patent Office 3,510,520
Patented May 5, 1970

3,510,520
LINEAR POLY-N-HALOAZIRIDINES
Allen F. Graefe, Claremont, Calif., assignor to Aerojet-General Corporation, El Monte, Calif., a corporation of Ohio
No Drawing. Continuation-in-part of application Ser. No. 282,136, May 21, 1963. This application Jan. 20, 1967, Ser. No. 610,504
Int. Cl. A01n 9/20; C07c 87/20; C08f 5/00
U.S. Cl. 260—583    1 Claim

ABSTRACT OF THE DISCLOSURE

A germicidal polymer having the formula:

$$-[CH_2-CH_2-NX]_n-$$

where X is a halogen and n is a whole number greater than one useful as general sanitizing agents, germicides and fungicides.

---

The instant application is a continuation-in-part of copending application Ser. No. 282,136, filed May 21, 1963, now abandoned.

SUMMARY OF THE INVENTION

This invention relates to novel polymers and methods for their production. More specifically, this invention relates to the preparation of an essentially linear poly-N-haloaziridines.

The novel polymers of this invention have valuable uses as general sanitizing agents and as germicides or fungicides. Poly-N-chloroaziridine, in particular, is useful as a high chlorine content bleach and as a general sanitizing agent. The polymers of this invention are solid substantially non-volatile materials which are insoluble in most common solvents except strong aqueous acids.

The essentially linear polymers of this invention have the following general formula:

$$-[CH_2-CH_2-NX]_n-$$

wherein X is a halogen having an atomic weight up to about 127, i.e., fluorine, chlorine, bromine and iodine, and n is a whole number greater than one and represents the number of repeating units in the polymer chain. It will be appreciated that in any given batch of product, molecules may vary in length from several to tens of thousands of repeating units. Hence, molecular weight figures represent statistical averages. The exact nature of terminal groupings is not known and will vary depending upon whether polymerization agents, chain-stopping agents, etc. are present. Preferably, the average molecular weight of the polymer products is in the range from about 20,000 to about 50,000.

The novel linear polymers of my invention may be prepared by two methods.

Method No. 1: Polymerization of N-haloaziridines. Poly-N-haloaziridines may be prepared by polymerizing the corresponding N-haloaziridine having the formula:

wherein X has the meaning shown above, in the presence of a strong acid catalyst. Preferably an acid at least as strong as phosphoric is used. Suitable acids include sulfuric, phosphoric, nitric, maleic, oxalic and phosphorous. A catalytically effective amount of acid is employed, but preferably about one part of acid for five parts of halo-aziridine is used. Acid in excess of this amount may be employed; however, when excess acid is used, the resulting product is contaminated somewhat with acid so that it must be purified. When about one part of acid is used for five parts of haloaziridine, no acid is obtained in the final product.

The temperature at which the polymerization can be conducted ranges generally from about —80° C. to about 72° C. At temperatures above 72° C., the polymer product decomposes to form unwanted products. The pressure under which the reaction takes place is not critical and preferably atmospheric pressures are employed. However, higher pressures up to about 50 atmospheres may be employed, if desired.

The solid poly-N-haloaziridine product is essentially linear and may be recovered by any of the common liquid-solid separation means such as filtration, decantation or centrifugation. The solid product may then be washed with a slightly acid aqueous solution to purify the product from any excess acid. Aqueous sulfamic acid is a preferred washing agent since sulfamic acid is a non-volatile solid and will provide a slightly acid residue upon drying, which will prevent attack by bases causing product decomposition.

The following examples are given in illustration and are not intended to limit the scope of the invention. Parts and percentages are by weight unless otherwise indicated.

EXAMPLE I

To 0.844 g. (10.89 mmoles)) of N-chloroaziridine at 0° C. was added 0.111 g. of 85% phosphoric acid (0.094 g. or 0.96 mmole of pure phosphoric acid). A white precipitate appeared within a few seconds. Stirring was continued during a fifteen minute warming period and subsequently for two hours at ambient temperature. The suspension was then poured into 5 ml. of 0.01 Normal aqueous sulfamic acid (H₂NSO₃H) and the solution was filtered through a medium frit. The white solid was washed with 5 ml. of 0.01 Normal aqueous sulfamic acid in two portions and was subsequently dried to constant weight under vacuum at ambient temperature. A total of 0.352 g. of white solid was recovered, or 4.54 milliformulaweights calculated as poly-N-chloroaziridine. A formulaweight is the weight in grams of one unit of the polymer chain. Polymerization had therefore proceeded to the extent of 41.7% and one part of acid was effective in polymerizing 4.7 parts of N-chloroaziridine. A sample of the dry solid was analyzed for positive halogen. The results indicated a purity of 92.9% calculated as poly-N-chloroaziridine.

It is also within the scope of this process to polymerize the N-haloaziridine in the presence of a strong acid and also a halogenating agent such as those described below in Method 2. The halogenating agent serves as a co-catalyst to obtain higher yields and/or higher purity.

EXAMPLE II

To 0.409 g. (5.28 mmoles) of N-chloroaziridine at 0° C. was added 0.061 g. (0.56 mmole) of t-butyl hypochlorite. The liquids were miscible and there was no evidence that a reaction had occurred. To this stirred solution, was added 0.050 g. of 85% phosphoric acid (0.043 g. or 0.44 mmole of pure phosphoric acid). This resulted in a violent reaction accompanied by the immediate formation of a heavy white precipitate. The reaction mixture was stirred for fifteen minutes at 0° C. and subsequently for twenty-five minutes at ambient temperature. The volatiles were removed under reduced pressure at ambient temperature leaving 0.201 g. of white solid or 2.60 milliformulaweights of poly - N - chloroaziridine. Polymerization had therefore proceeded to the extent of 39.2%. The solid was taken up in 0.01 Normal aqueous sulfamic acid, washed, dried and analyzed as described above. The results indicated a purity of 90.5 percent calculated as poly-N-chloroaziridine.

When N-chloroaziridine is replaced by N - bromoaziridine or N-iodoaziridine, poly-N-bromoaziridine and poly-N-iodoaziridine respectively are obtained.

Method No. 2: Poly-N-haloaziridines may be prepared by the halogenation of polyethylenimine.

Halogenating agents which are suitable in this method include any halogenating agents which do not form a strong base upon reaction. An agent such as NaOCl forms NaOH upon reaction and would not be suitable. Suitable halogenating agents include chlorine, bromine, iodine, fluorine and agents containing an O—Cl, O—Br, O—I or O—F bond such as tertiary butyl hypochlorite.

Reaction takes place according to the following scheme; using t-butyl hypochlorite as an example:

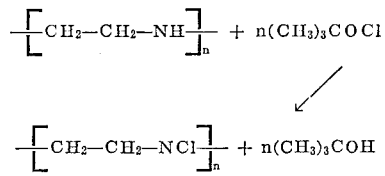

Sufficient halogenating agent must be employed so that one halogen atom is present for each repeating unit in the polyethylenimine chain. Generally, it is desirable to employ a slight excess of the halogenating agent.

The reaction takes place in the presence or absence of a solvent. Solvents which may be employed include slightly acid aqueous solutions. An excess of liquid halogenating agent may also act as the solvent. The temperature and pressure under which the reaction can be conducted are the same as that discussed above for Method No. 1.

The solid product obtained by this method may be recovered by any of the common liquid-solid separation means such as decantation, centrifugation and filtration. The product may then be washed with a slightly acid aqueous solution to remove any acid present in the product.

EXAMPLE III

To 2.15 g. of 50 percent aqueous polyethylenimine (25 mmoles of polyethylenimine) was added 10 ml. of water and 15 ml. of glacial acetic acid. To the resulting clear solution at 5° C. was added with stirring 2.9 g. of t-butyl hypochlorite (25 mmoles) over a period of ten minutes. A white precipitate formed during the addition. After continued stirring for 15 minutes following the addition of t-butyl hypochlorite, the mixture was slowly warmed to ambient temperature. The solution was filtered with suction and the solid was dried under vacuum at ambient temperature to constant weight (0.40 g. or 20 percent of theory). An analysis of the solid for positive chlorine indicated a purity of 95.6 percent calculated as poly-N-chloroaziridine.

EXAMPLE IV

A suspension of polyethylenimine in aqueous-methanolic sulfuric acid was prepared from 2.15 g. of 50 percent aqueous polyethylenimine (25 mmoles of polyethylenimine) 100 ml. of water and 15 ml. of 4 Normal sulfuric acid in methanol. To the well-stirred suspension at 5° C. was added 2.9 g. of t-butyl hypochlorite (25 mmoles) during a ten minute period. Initially, the yellow color of the t-butyl hypochlorite persisted and it appeared that no appreciable increase in the amount of undissolved solid occurred. However, nearing the completion of the addition of t-butyl hypochlorite, a voluminous-white precipitate appeared with the simultaneous decolorization of the solution. The mixture was stirred for an additional 15 minutes at 5° to 8° C. and was subsequently warmed slowly to ambient temperature. The solution was filtered and the solid washed three times with 0.01 Normal sulfuric acid. The vacuum-dried solid weighed 0.92 g. (46 percent yield) calculated as poly-N-chloroaziridine. A sample of this material when dissolved in 1 Normal sulfamic acid and an aliquot analyzed for positive halogen was found to contain 100.2 percent of that expected for poly-N-chloroaziridine. The titration of additional aliquots over a three day period indicated no change in positive halogen content. The final aliquot was heated to reflux above 100° C. for one and one-half hours. No precipitation or colorization of the solution occurred during this period. Analysis of the cooled solution indicated a loss in positive halogen of 6 percent which indicated that very little decomposition had occurred.

When free chlorine is used as the chlorinating agent instead of t-butyl hypochlorite, in Example IV above, a good yield of poly-N-chloroaziridine is obtained.

When free bromine and free iodine are used as halogenating agents, the corresponding poly-N-haloaziridines are obtained.

Each step of the above processes is preferably carried out with agitation. While agitation is not critical, it is preferred since a more even reaction rate is obtained.

The time required for each of the above-disclosed processes is not critical and depends upon other reaction conditions. Generally, however, a time period of ten minutes to twenty-four hours is sufficient.

I claim:
1. As compositions of matter essentially linear polymers having the formula:

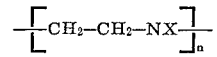

wherein X is a halogen selected from the group consisting of chlorine, bromine and iodine, and $n$ is a whole number selected such that said polymers have an average molecular weight of from about 20,000 to about 50,000.

References Cited

UNITED STATES PATENTS 2,271,378    1/1942    Searle.

CHARLES B. PARKER, Primary Examiner

R. L. RAYMOND, Assistant Examiner

U.S. Cl. X.R.

252—102, 186; 260—88.3, 999